United States Patent
Sharma et al.

(10) Patent No.: US 8,964,337 B2
(45) Date of Patent: Feb. 24, 2015

(54) METHODS AND SYSTEMS FOR MONITORING EXCITATION OF A GENERATOR BASED ON A FAULTY STATUS OF A GENERATOR BREAKER

(71) Applicant: General Electric Company, Schenectady, NY (US)

(72) Inventors: Abhinandan Sharma, Andhra Pradesh (IN); Shashidhar Nibhanupudi, Andhra Pradesh (IN); Sridhar Nedunsezian, Andhra Pradesh (IN)

(73) Assignee: General Electric Company, Schenectady, NY (US)

( * ) Notice: Subject to any disclaimer, the term of this patent is extended or adjusted under 35 U.S.C. 154(b) by 159 days.

(21) Appl. No.: 13/729,885

(22) Filed: Dec. 28, 2012

(65) Prior Publication Data

US 2014/0185166 A1 Jul. 3, 2014

(51) Int. Cl.
 G08B 21/00 (2006.01)
 G06F 15/00 (2006.01)
 H02H 7/06 (2006.01)

(52) U.S. Cl.
 CPC ..................................... *H02H 7/06* (2013.01)
 USPC ................. 361/21; 361/33; 361/88; 318/140; 318/141; 318/142; 318/143; 324/415; 324/424; 324/76.11; 322/22; 322/23; 322/24; 322/27; 322/37; 340/635; 340/657; 323/234; 290/42; 290/40 B (58) Field of Classification Search
 USPC ........ 361/21, 33, 88; 318/140, 141, 142, 143; 324/415, 424, 76.11; 340/635, 657; 322/22, 23, 24, 27, 37, 44, 45
 See application file for complete search history.

(56) References Cited

U.S. PATENT DOCUMENTS

| | | | |
|---|---|---|---|
| 3,035,181 A | 5/1962 | Laudel, Jr. | |
| 3,639,810 A | 2/1972 | Schleif | |
| 4,788,619 A * | 11/1988 | Ott et al. | 361/91.1 |
| 4,788,647 A * | 11/1988 | McManus et al. | 364/494 |
| 4,952,852 A * | 8/1990 | Bando et al. | 318/140 |
| 5,095,399 A | 3/1992 | Terada et al. | |
| 5,168,699 A | 12/1992 | McCarty et al. | |
| 5,592,393 A | 1/1997 | Yalla | |
| 6,894,402 B2 | 5/2005 | Dubus et al. | |
| 7,212,390 B2 | 5/2007 | Ouvry | |
| 7,936,549 B2 * | 5/2011 | Takeuchi et al. | 361/139 |
| 8,049,455 B2 | 11/2011 | Kitanaka | |
| 8,097,971 B2 * | 1/2012 | Ichinose et al. | 290/44 |
| 8,547,668 B2 * | 10/2013 | Dahlen | 361/20 |
| 8,676,386 B2 * | 3/2014 | Klodowski et al. | 700/276 |
| 2003/0038482 A1 | 2/2003 | Dubus et al. | |
| 2004/0136125 A1 | 7/2004 | Nemir et al. | |
| 2010/0265629 A1 | 10/2010 | Beckerman | |

\* cited by examiner

*Primary Examiner* — Rita Leykin
(74) *Attorney, Agent, or Firm* — Sutherland Asbill & Brennan LLP (57) ABSTRACT

Systems and methods for monitoring excitation of a generator based on a faulty status of a generator breaker are provided. According to one embodiment, a system may include a controller and a processor communicatively coupled to the controller. The processor may be configured to receive, from a contact associated with a generator breaker, a reported status of the generator breaker, receive operational data associated with one or more parameters of a generator associated with the generator breaker, and correlate the reported status of the generator breaker and the operational data. Based on the correlation, the processor may establish an actual status of the generator breaker, and, based on the actual status, selectively modify a mode of excitation of the generator.

20 Claims, 9 Drawing Sheets

METHODS AND SYSTEMS FOR MONITORING EXCITATION OF A GENERATOR BASED ON A FAULTY STATUS OF A GENERATOR BREAKER

TECHNICAL FIELD

This disclosure relates generally to field excitation control systems and, more particularly, to systems and methods for monitoring excitation of a generator based on a faulty status of a generator breaker.

BACKGROUND

In an electric generator, electricity is produced by a rotor spinning in a magnetic field. One way to produce the magnetic field is by using field coils with a current flowing in them. When there is no current in the coils, the magnetic field is not generated, and electric power is not produced by the generator. The process of generating a magnetic field by means of an electric current is called excitation.

By regulating the field current being fed into field coils of the generator, the generator terminal voltage can be controlled. Regulation of excitation and switching between excitation modes can be performed automatically. This can be done based on a status of a generator's breaker. When the status of the generator breaker is "open," the excitation mode is "offline"; when the generator breaker is closed, the operation mode is switched to "online."

However, a faulty status may be reported when a contact of the generator breaker malfunctions. If this is the case, the exciter is switched to a wrong operation mode, thus impairing the operation of the generator.

BRIEF DESCRIPTION OF THE DISCLOSURE

The present disclosure relates to systems and methods for monitoring excitation of a generator based on a faulty status of a generator breaker. According to one embodiment, a method can be provided. The method can include receiving, from a contact associated with the generator breaker, a reported status of the generator breaker; receiving operational data associated with one or more parameters of a generator associated with the generator breaker; and correlating the reported status of the generator and the operational data. Based on the correlation, an actual status of the generator breaker may be established, and based on the actual status, a mode of excitation of the generator may be selectively modified.

According to one embodiment, a system may include a controller and a processor communicatively coupled to the controller. The processor may be configured to receive, from a contact associated with a generator breaker, a reported status of the generator breaker; receive operational data associated with one or more parameters of a generator associated with the generator breaker; and correlate the reported status of the generator breaker and the operational data. Based on the correlation, the processor may establish an actual status of the generator breaker, and based on the actual status, selectively modify a mode of excitation of the generator.

In one embodiment, another system can be provided. The system can include a generator, an exciter coupled to the generator, a generator breaker coupled to the generator, a contact coupled to the generator breaker, a controller communicatively coupled to the generator and the exciter, and a processor communicatively coupled to the controller. The processor may be configured to: receive, from the contact associated with the generator breaker, a reported status of the generator breaker; receive operational data associated with one or more parameters of the generator associated with the generator breaker; and correlate the reported status of the generator breaker and the operational data. Based on the correlation, the processor may establish an actual status of the generator breaker, and based on the actual status, selectively modify a mode of excitation of the generator.

Other embodiments and aspects will become apparent from the following description taken in conjunction with the following drawings.

DETAILED DESCRIPTION

The following detailed description includes references to the accompanying drawings, which form part of the detailed description. The drawings depict illustrations in accordance with example embodiments. These example embodiments, which are also referred to herein as "examples," are described in enough detail to enable those skilled in the art to practice the present subject matter. The example embodiments may be combined, other embodiments may be utilized, or structural, logical, and electrical changes may be made, without departing from the scope of the claimed subject matter. The following detailed description is, therefore, not to be taken in a limiting sense, and the scope is defined by the appended claims and their equivalents.

The embodiments described herein relate to systems and methods for monitoring excitation of a generator based on a faulty status of a generator breaker. In the process of power production, terminal voltage of a generator may be controlled by regulating the exciter based on a generator breaker status reported by a contact. The reported status of the generator breaker may be ascertained by correlating the reported status with operational data of the generator breaker. If the operational data correlates to the reported status of the generator breaker, the reported status may be considered an actual status, with no further action taken. However, if the operational data contradicts the reported status of the generator breaker, the reported status may be considered faulty, and the actual status may be established. In this case, the mode of excitation of the generator may be changed according to the actual status established.

The technical effects of certain embodiments of the disclosure may include preventing unintended operation of the excitation control system. This may allow avoiding disorders in the operation of a generator, thus ensuring the generator's stable and unimpeded performance.

Figure 1:
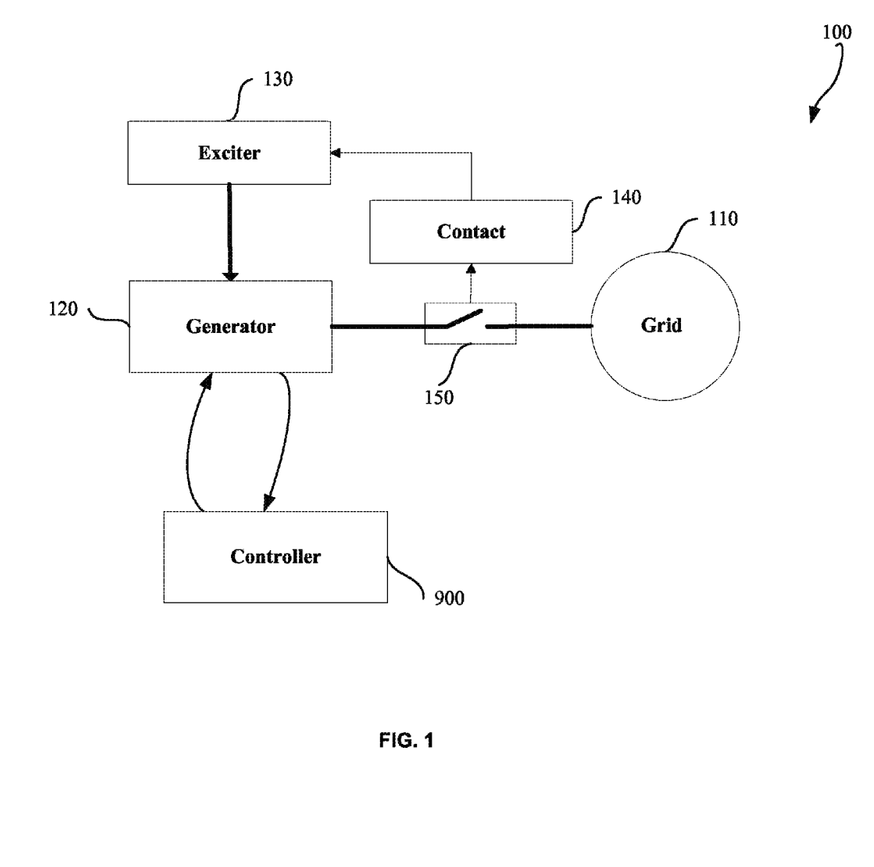
FIG. 1 depicts a simplified block diagram illustrating an example environment and a system suitable for monitoring excitation of a generator based on a faulty status of a generator breaker, in accordance with an embodiment of the disclosure.

Referring now to FIG. 1, a block diagram illustrates an example system environment 100 suitable for monitoring excitation of a generator based on a faulty status of a generator breaker, in accordance with one or more example embodiments. In particular, the system environment 100 may comprise a generator 120, an exciter 130, a generator breaker 150, a contact 140, a grid 110, and a controller 900.

The exciter 130 may be coupled to, or form a part of, the generator 120. The exciter 130 may produce a magnetic field for generating electric power in the generator 120. The power generated by the generator 120 is provided to the grid 110. Connection of the generator 120 to the grid 110 may be controlled by the closing or opening of the generator breaker 150. The contact 140 may sense information on a status (open or closed) of the generator breaker 150. The status may be reported to the exciter 130 in order to regulate the excitation mode. Thus, when the generator breaker 150 is closed, the exciter 130 may be switched to the online mode. In the online mode, the exciter 130 may produce a magnetic field, thus enabling the generator 120 to produce power. And vice versa, when the generator breaker 150 is open, the exciter 130 may be switched to the offline mode and current to the field coils is reduced. However, in case of a malfunction of contact 140, the contact 140 can report a faulty status of the generator breaker 150. Then, based on the faulty status, the exciter 130 may switch to a mode that does not correspond to an actual status of the generator breaker 150. For example, the exciter 130 may erroneously switch to the offline mode, when the actual status of the generator breaker 150 is closed. In the offline mode, an overexcitation limit may be annunciated, and the exciter 130 may start reducing the field current to bring the system back to below the overexcitation limit. This may impede increasing the output voltage of the generator 120 if required.

To avoid this impedance, the controller 900 may receive operational data of the generator 120 (for example, a load current, or change in voltage of the generator 120 over a period of time). The operational data may be considered in combination with the reported status of the generator 120. For example, in some embodiments using the load current to determine the actual status of the generator breaker 150, the load current trajectory may be correlated to the reported status of the generator 120. After a true generator breaker opening event, the load current trajectory is expected to go to zero. If the reported status of the generator breaker 150 is open, but the value of the load current has not substantially changed, the reported status may be erroneous. The actual status of the generator breaker 150 in that case may be established as "closed." The actual status may then be transferred to the exciter 130 to modify the mode of excitation.

In other embodiments, where the voltage trajectory is used to determine the actual status of the generator breaker 150, the voltage trajectory for a certain period of time associated with the moment of the reported status change may be correlated to the reported status of the generator 120. After a true generator breaker opening event, the voltage is expected to experience transient events. If the reported status of the generator breaker 150 is open, but the voltage remains substantially stable, the reported status may be erroneous. The actual status of the generator breaker 150 may be established as "closed" in that case. The actual status may then be transferred to the exciter 130 to modify the mode of excitation.

The operation of the generator 120 may be managed through the controller 900. The controller 900 may interact with the generator breaker 150 and the contact 140 to receive the reported status of the generator breaker 150. The controller 900 may also be coupled to the exciter 130 to manage its operation and receive data associated with modes of excitation of the generator 120.

An operator may interact with the controller 900 via a user interface device, such as a keyboard, mouse, control panel, or any other device capable of communicating data to and from the controller 900.

Figure 2:
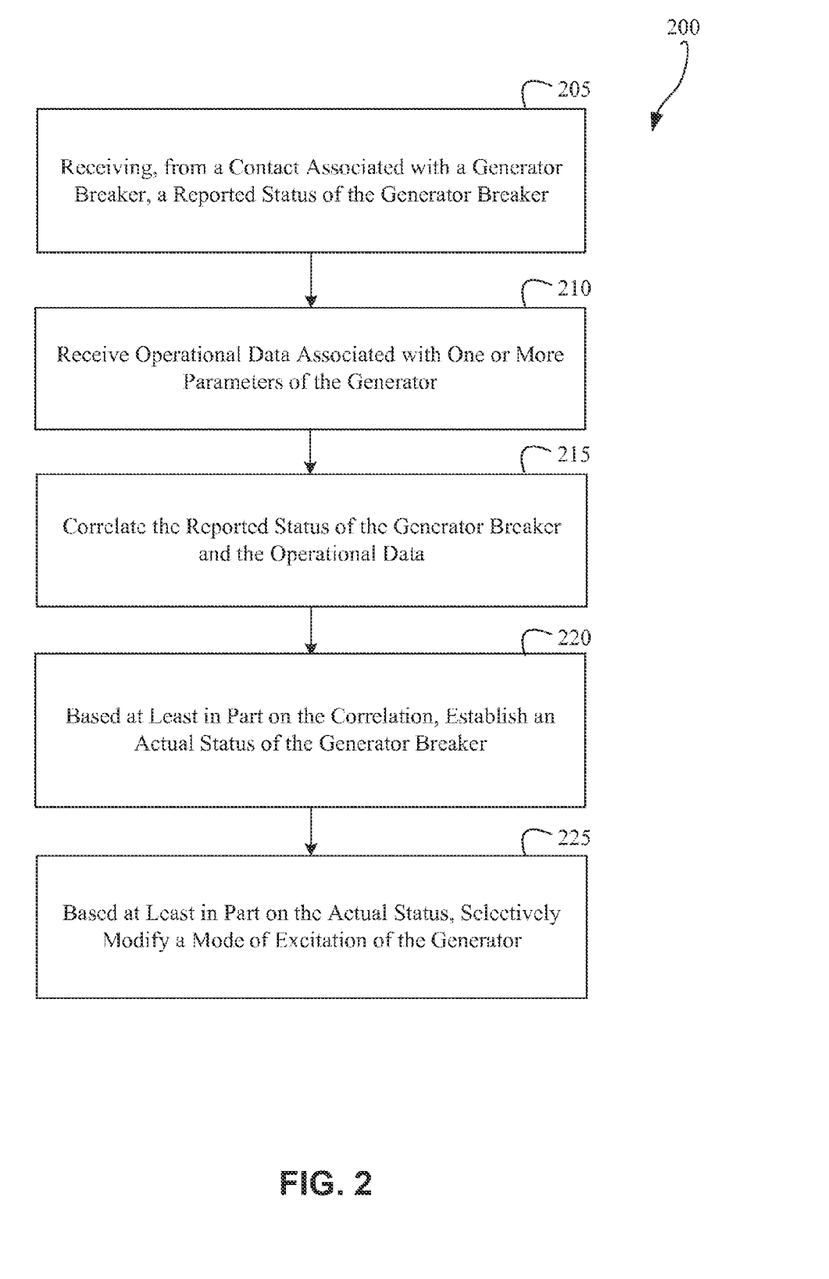
FIG. 2 depicts an example method for monitoring excitation of a generator based on a faulty status of a generator breaker, in accordance with an embodiment of the disclosure.

FIG. 2 depicts a process flow diagram illustrating an example method 200 for monitoring excitation of a generator based on a faulty status of a generator breaker, in accordance with an embodiment of the disclosure. The method 200 may be performed by processing logic that may comprise hardware (e.g., dedicated logic, programmable logic, and microcode), software (such as software run on a general-purpose computer system or a dedicated machine), or a combination of both. In one example embodiment, the processing logic resides at the controller 900, which may reside in a user device or in a server. The controller 900 may comprise processing logic. It will be appreciated by one of ordinary skill in the art that instructions said to be executed by the controller 900 may, in fact, be retrieved and executed by one or more processors. The controller 900 may also include memory cards, servers, and/or computer discs. Although the controller 900 may be configured to perform one or more operations described herein, other control units may be utilized while still falling within the scope of various embodiments.

As shown in FIG. 2, the method 200 may commence at operation 205 with receiving a reported status of a generator breaker from a contact associated with the generator breaker. The reported status may announce, for example, that the generator breaker is open or closed. In some example embodiments, the reported status may be provided to the exciter of the generator. Based on the reported status, the exciter may switch to a mode of excitation that corresponds to the reported status. For example, when the reported status is open, the mode of excitation may be switched to offline.

At operation 210, operational data associated with one or more parameters of the generator associated with the generator breaker may be received. The operational data may include a load current of the generator, change in generator voltage over a period of time, and so forth. In different embodiments, to determine the change in the generator voltage, voltage data may be received for different periods of time. For example, the period of time may start before, at, or after a moment of a reported change in a status of the generator breaker. The end of the period of time may be after the reported change.

At operation 215, the reported status of the generator breaker and the operational data may be correlated. A certain status of the generator breaker may be associated with specific behavior of the parameters of the generator. For example, when the status of the generator breaker changes to open, the load current is expected to go to about zero, and the voltage is expected to increase. The reported status and the operational data may be compared to check whether the behavior of the parameters of the generator corresponds to the expected behavior for the status that was reported.

Based on the correlation, an actual status of the generator breaker may be established at operation 220. The actual status may correspond to the reported status or may be different. When the correlation determines that the parameters of the generator confirm the reported status, the actual status may be established as the same as the reported status. For example, when the reported status is open, and the value of the load current received after the reported status is about zero, the reported status may be considered to be the true status. Then, the actual status may be established as open (the same as the reported status). On the other hand, when the value of the load current received after the reported status is not about zero, the reported status may be considered a faulty status. This may indicate a malfunction of a contact of the generator breaker reporting the status of the generator breaker. The actual status may then be established as closed (contrary to the reported status).

At operation 225, based on the actual status, the mode of excitation of the generator may be selectively modified. If it is determined based on the correlation of the reported status and the operation data that the reported status is faulty, and the established actual status differs from the reported status, the mode of excitation set according to the faulty reported status may not correspond to the actual status. In this case, the mode of excitation of the generator may be modified in accordance with the actual status. However, when the actual status is the same as the reported status, the mode of excitation of the generator may not be modified because it corresponds to the actual status as it is.

In some embodiments, status of the generator breaker may be confirmed using operational data associated with a value of a load current. The confirmation may be based on the fact that the load current is expected to go to about zero after opening a generator breaker.

Figure 3:
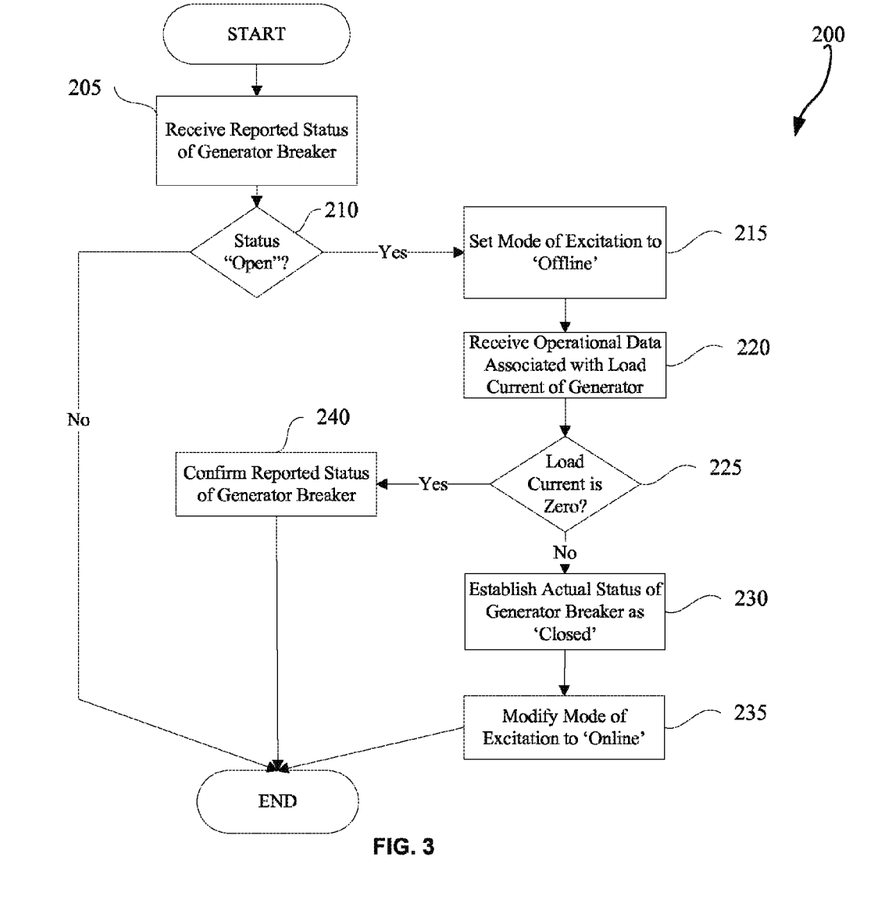
FIG. 3 depicts an example method for monitoring excitation of a generator based on a faulty status of a generator breaker determined using load current data, in accordance with an embodiment of the disclosure.

FIG. 3 depicts a process flow diagram illustrating a detailed example method 300 for monitoring excitation of a generator based on a faulty status of a generator breaker determined using load current data, in accordance with an embodiment of the disclosure. A status of the generator breaker may be used by an exciter to determine a mode of excitation. At operation 305, a reported status of the generator breaker may be received from a contact coupled to the generator breaker. The received reported status may be determined at operation 310. If the status is open, the mode of excitation of the generator may be set to offline at operation 315. Then, a load current of the generator may be received at operation 320. If the load current is about zero as determined at operation 325, then the reported status "open" is true, and the reported status of the generator breaker may be confirmed at operation 340. In this case, no further action may be performed, and the method may end. However, if the load current is not about zero as determined at operation 325, then the reported status "open" is faulty. Then, the actual status of the generator breaker may be established as closed at operation 330 in contrast to the reported status. Consequently, the mode of excitations of the generator may be modified to online at operation 335 according to the actual status.

On the other hand, if the status of the generator breaker determined at operation 310 is not open (i.e., closed), no action may be required and the method 300 may end.

Figure 5:
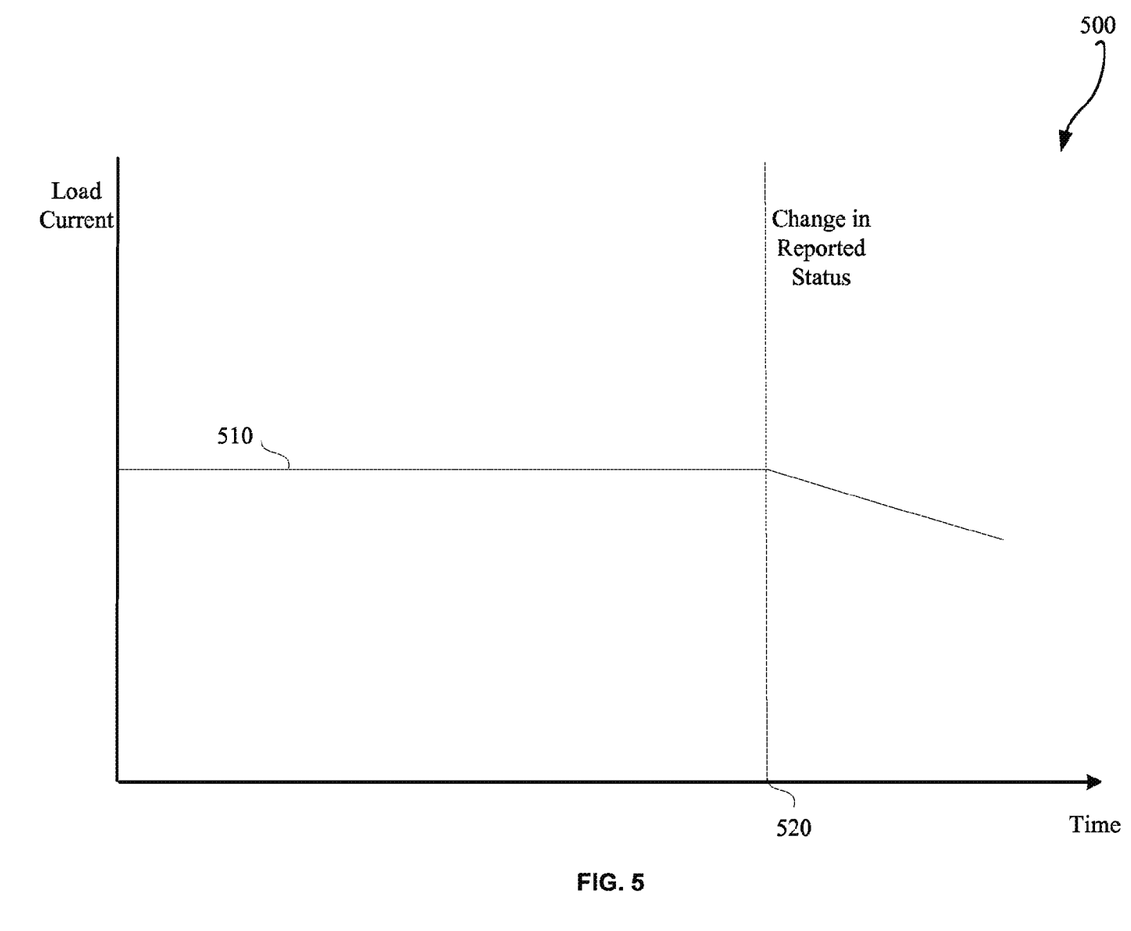
FIG. 5 depicts an example load current path, in accordance with an embodiment of the disclosure.

The load current used to confirm the reported status of the generator breaker is represented by FIG. 5. FIG. 5 depicts a representation of an example load current path 500, in accordance with an embodiment of the disclosure. A load current 510 may show the load current value of the generator in relation to time. A reported status time 520 may indicate when a change in the status of the generator breaker was reported.

After the change of a status of the generator breaker, the load current 510 may decrease to about zero. This may indicate that the generator breaker was open. If the reported status is "open," then such a decrease confirms the open status of the generator breaker, and the status may be considered true.

In other embodiments, to verify the reported status of the generator breaker, operational data associated with a change in voltage may be used. The voltage of the generator may vary depending on the status of the generator breaker. Thus, when the generator breaker is open, the voltage of the generator may increase. Such dependency may be used to check the reported status of the generator breaker, as shown by FIG. 4.

Figure 4:
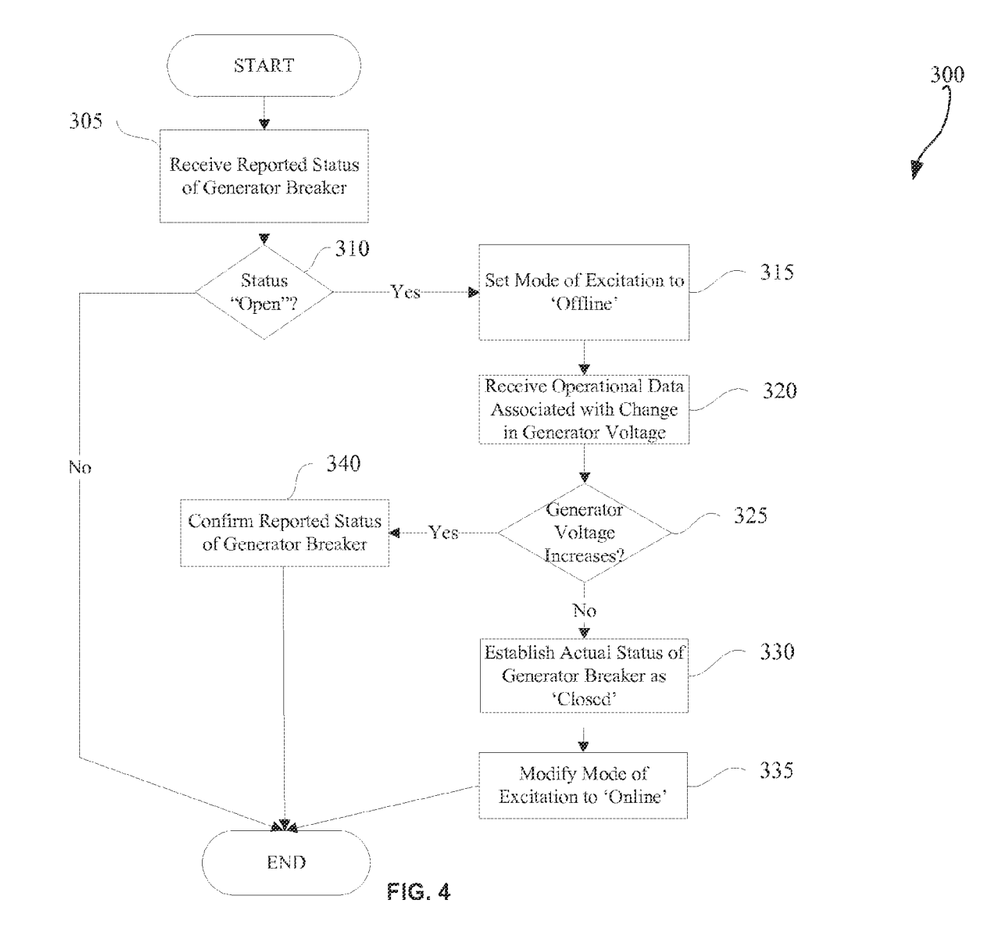
FIG. 4 depicts an example method for monitoring excitation of a generator based on a faulty status of a generator breaker determined using generator voltage change data, in accordance with an embodiment of the disclosure.

FIG. 4 depicts a process flow diagram illustrating a detailed example method 400 for monitoring excitation of a generator based on a faulty status of a generator breaker determined using generator voltage change data, in accordance with an embodiment of the disclosure. At operation 405, a reported status of the generator breaker may be received from a contact coupled to the generator breaker. The received reported status may be determined at operation 410. If the status is open, the mode of excitation of the generator may be set to offline at operation 415. Then, operational data associated with a change in the voltage of the generator may be received at operation 420.

To determine a change in voltage of the generator, two or more values of the voltage for different time points may be received. By comparing the values of the voltage, it may be determined whether the voltage is transient or stable after the reported change in the status. The values of the voltage may be associated with moments of time indicating the start of a period of time used for determination of the change in the voltage of the generator and the end of that period of time. The starting time point may be before the time of the reported status, at the time of the reported status, or after it, according to different embodiments, whereas the ending time point may be after the time of the reported status. Example time periods that may be used for determining a change in the voltage of the generator are shown below with reference to FIGS. 6-8.

Back to FIG. 4, the change in the generator voltage received at operation 420 may be evaluated at operation 425. If the generator voltage is transient, then the reported status "open" is true, and the reported status of the generator breaker may be confirmed at operation 440. Otherwise, the reported status "open" is faulty, and the actual status of the generator breaker may be established as closed at operation 430 (in contrast to the reported status). At operation 435, the mode of excitation of the generator may be modified to online according to the established actual status.

On the other hand, if the status determined at operation 410 is not open (i.e., closed), no action may be required, and the method 400 may end.

According to some embodiments, a time period for determining a change in voltage of the generator may start before a moment of time when the status was reported and end after that moment.

Figure 6:
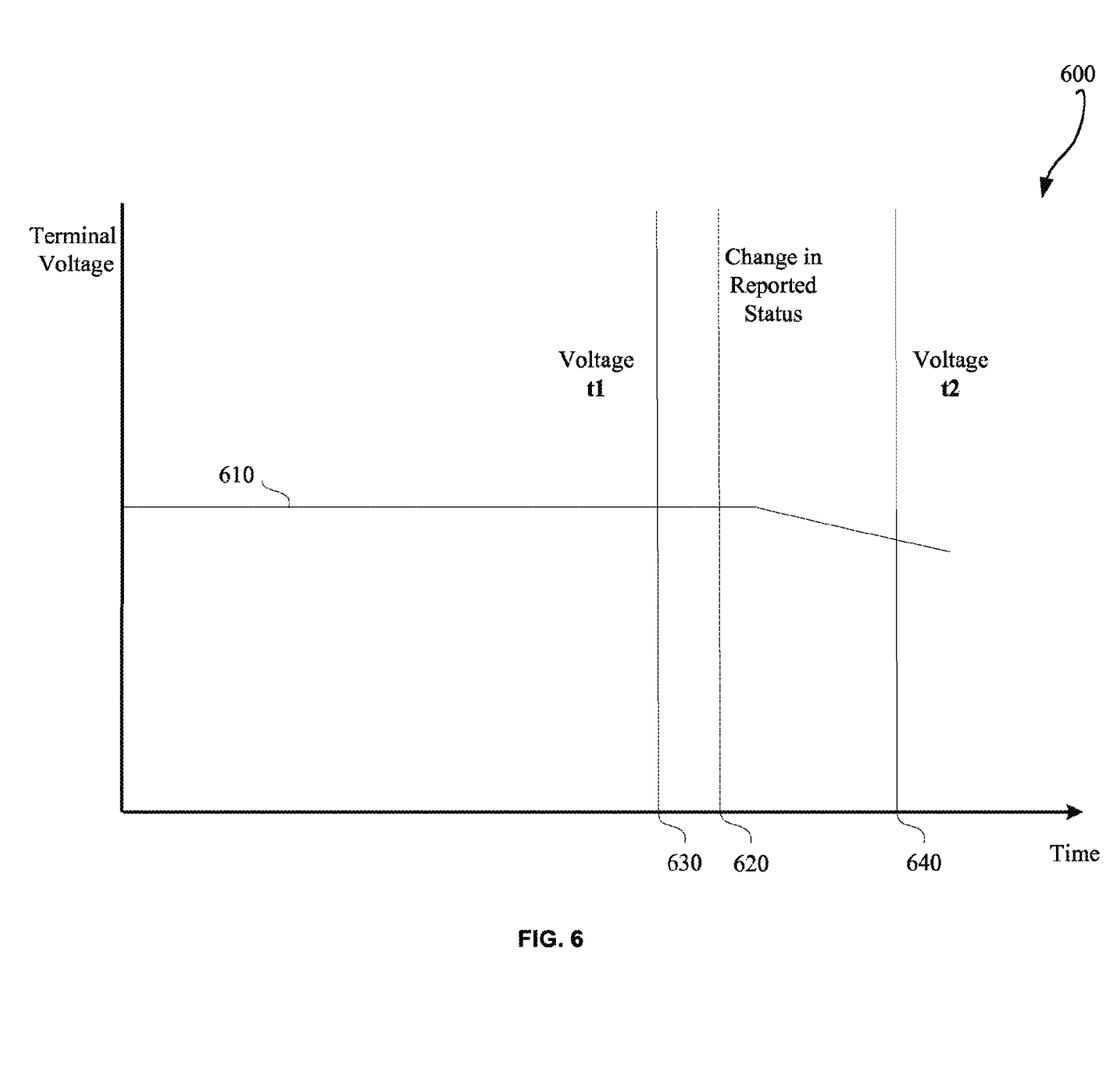
FIG. 6 depicts an example voltage path, in accordance with an embodiment of the disclosure.

FIG. 6 depicts a representation of an example voltage path 600, in accordance with an embodiment of the disclosure. A voltage trajectory 610 may represent terminal voltage of the generator over time. A reported status time 620 may indicate when a change in the status of the generator breaker was reported. A starting voltage value 630 may represent a voltage value at a moment of time before the reported status time 620. An ending voltage value 640 may represent a voltage value at a moment of time after the reported status time 620.

If the reported status of the generator breaker is a true event, it may be supported by a change in the voltage trajectory 610 of the generator. Thus, the voltage trajectory 610 showing transients in the voltage after the reported status time 620 may indicate that the generator breaker is open. If this report contradicts the reported status, then the reported status may be faulty. In that case, an actual status different from the reported status may be established, and the mode of the excitation of the generator may be modified accordingly.

Thus, the period of time from starting voltage value 630 to the ending voltage value 640 may start before the reported status time 620 and end after it. Such a period may include transients in the voltage trajectory 610 that may be used to either confirm or deny the reported status of the generator breaker. In some embodiments, a period of time used to confirm or deny the reported status of the generator breaker may be different in relation to the reported status time 620.

Figure 7:
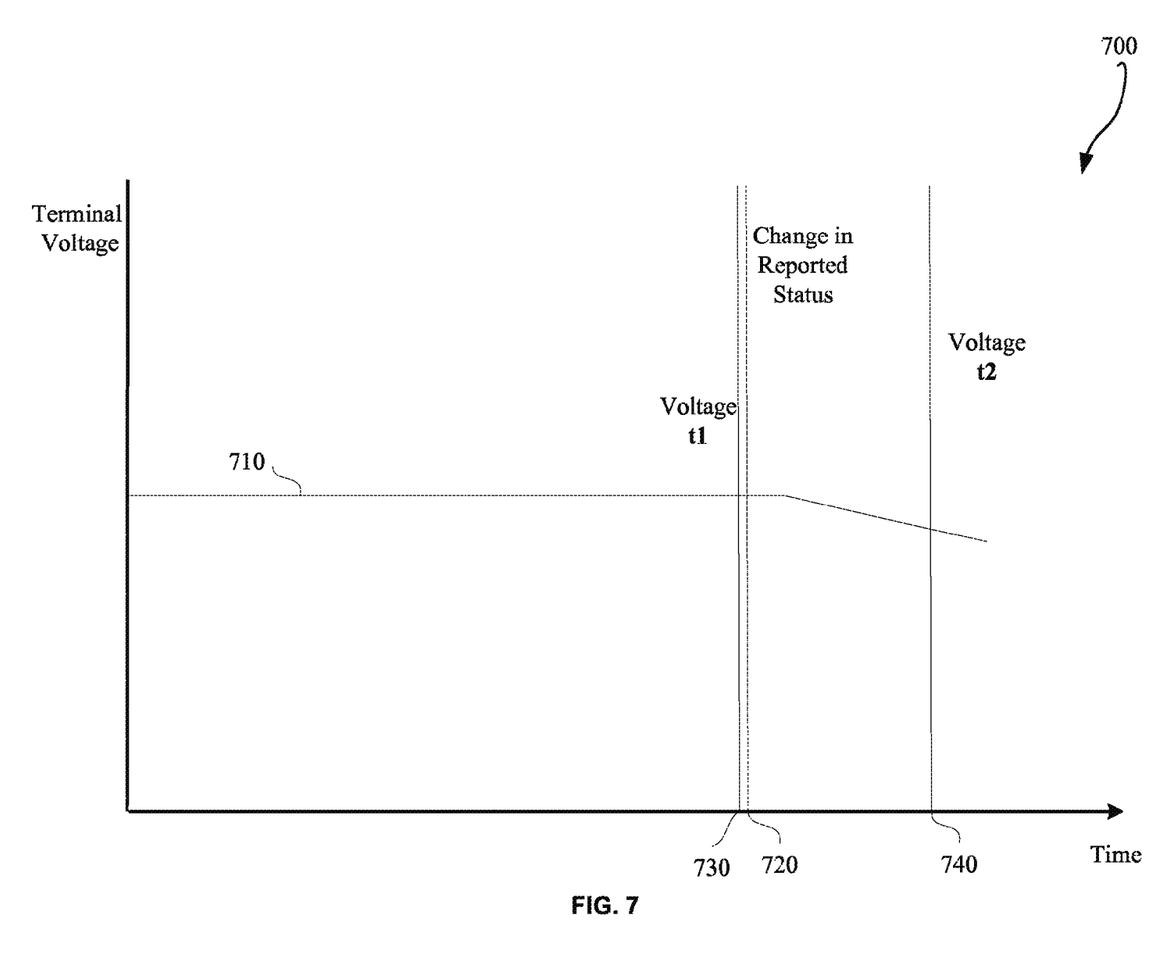
FIG. 7 depicts another example voltage path, in accordance with an embodiment of the disclosure.

FIG. 7 depicts a representation of another example voltage path 700, in accordance with an embodiment of the disclosure. Here, the period of time for evaluation of a voltage trajectory 710 shown in FIG. 7 starts at the moment of a reported status time 720 (a starting voltage value 730 coincides with the reported status time 720). An ending voltage value 740 may be after the reported status time 720.

The shown period of time captures a change in the voltage trajectory 710 caused by an opening of the generator breaker and associated transients, so this period of time may demonstrate an actual status of the generator breaker.

As the voltage trajectory 710 indicates transients in the voltage of the generator, the actual status of the generator breaker may be set to open. If the reported status of the generator breaker is different, it may be evidence that a malfunction of a contact sensing a status of the generator breaker.

In other embodiments, the period of time used to check the reported status of the generator breaker may be after the time of the reported status.

Figure 8:
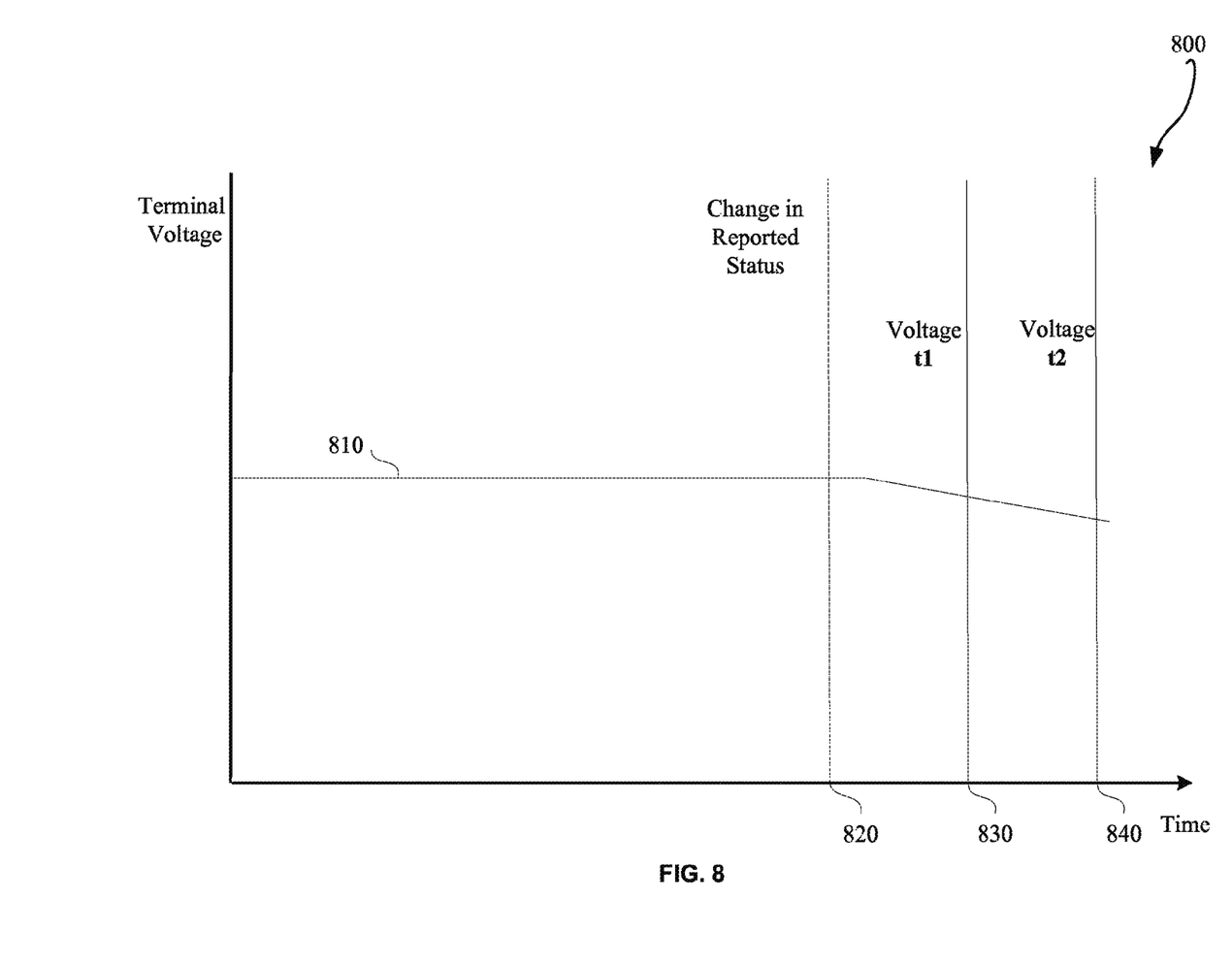
FIG. 8 depicts yet another voltage path, in accordance with an embodiment of the disclosure.

FIG. 8 depicts a representation of yet another example voltage path 800, in accordance with an embodiment of the disclosure. A reported status time 820 may indicate when a change in the status of the generator breaker was reported. A starting voltage value 830 and an ending voltage value 840 may represent voltage values after the reported status time 820 and comprising a period of time used to determine transients in a voltage trajectory 810. The period of time from the starting voltage value 830 to the ending voltage value 840 includes a decrease in the voltage trajectory 810 resulting from a change in a status of the generator breaker, so an actual status of the generator breaker may be established based on the change of the voltage trajectory 810.

Thus, transients in the voltage trajectory 810 indicate an opening of the generator breaker. So, if the reported status of the generator breaker is "open," then the voltage trajectory 810 may confirm the reported status, and the actual status may be also set to "open." In this case, the mode of excitation may remain unmodified, as the reported status is not faulty.

Figure 9:
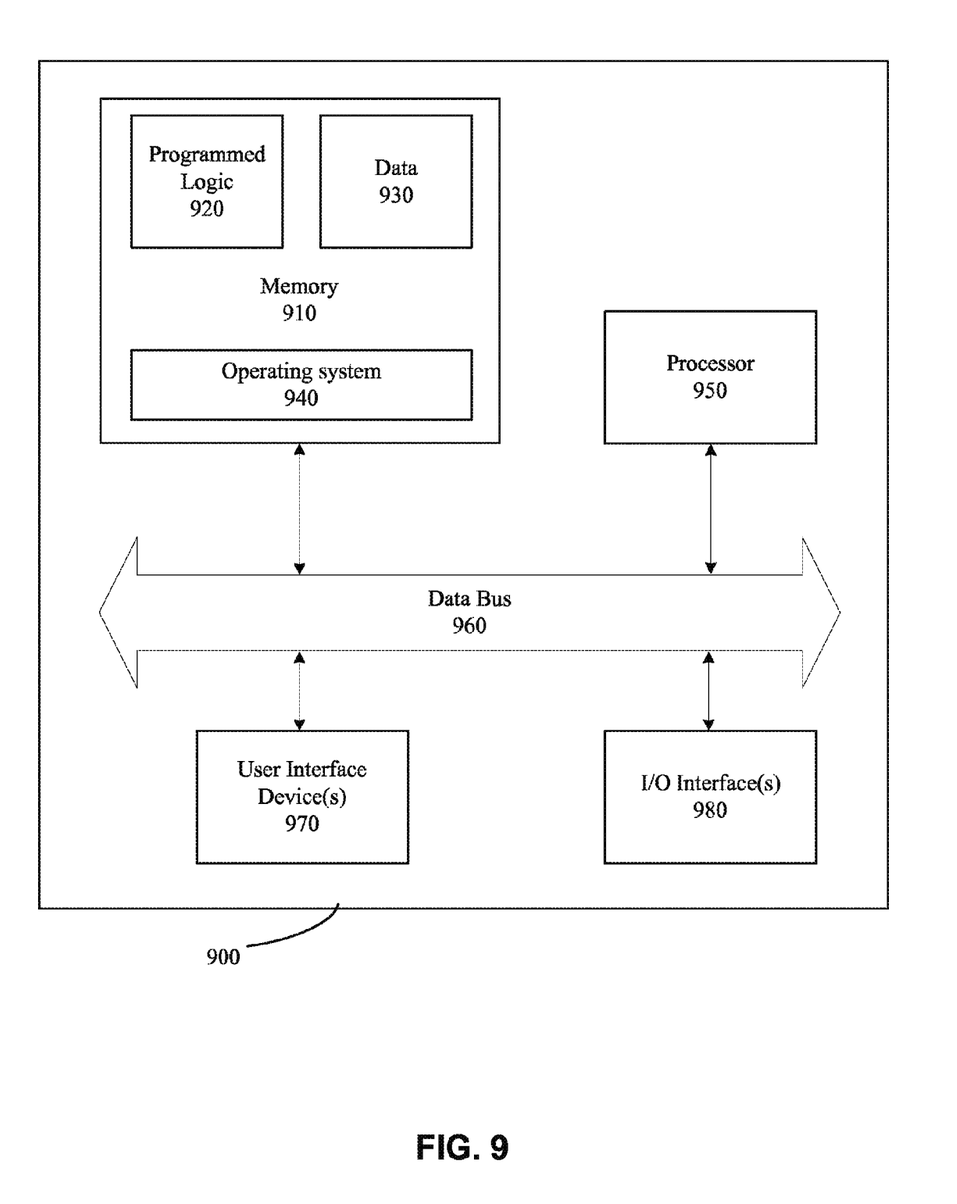
FIG. 9 depicts a block diagram of an example controller for monitoring excitation of a generator based on a faulty status of a generator breaker, in accordance with an embodiment of the disclosure.

FIG. 9 depicts a block diagram illustrating an example controller 900 for monitoring excitation of a generator based on a faulty status of a generator breaker, in accordance with an embodiment of the disclosure. More specifically, the elements of the controller 900 may be used to receive a reported status of the generator breaker from a contact of a generator breaker; receive operational data associated with the parameters of a generator associated with the generator breaker; correlate the reported status of the generator breaker and the operational data; based on the correlation, establish an actual status of the generator breaker; and based on the actual status, selectively modify a mode of excitation of the generator. The controller 900 may include a memory 910 that stores programmed logic 920 (e.g., software) and may store data, such as a reported status of the generator breaker, operational data associated with parameters of a generator, an actual status of the generator breaker, and the like. The memory 910 also may include an operating system 940. A processor 950 may utilize the operating system 940 to execute the programmed logic 920, and in doing so, also may utilize data 930. A data bus 960 may provide communication between the memory 910 and the processor 950. Users may interface with the controller 900 via at least one user interface device 970 such as a keyboard, mouse, control panel, or any other device capable of communicating data to and from the controller 900. The controller 900 may be in communication with the generator online while operating, as well as in communication with the generator offline while not operating, via an I/O interface 980. More specifically, one or more of the controllers 900 may carry out the methods described with reference to FIGS. 2, 3, and 4 including receiving, from a contact associated with a generator breaker, a reported status of the generator breaker; receiving operational data associated with the parameters of a generator (for example, a load current or a change in generator voltage); correlating the reported status of the generator and the operational data; establishing an actual status of the generator breaker based on the correlation; and based on the actual status, selectively modifying a mode of excitation of the generator. Additionally, it should be appreciated that other external devices or multiple other turbines may be in communication with the controller 900 via the I/O Interface 980. In the illustrated embodiment, the controller 900 may be located remotely with respect to the generator, although it may be co-located or even integrated with the generator. Further, the controller 900 and the programmed logic 920 implemented thereby may include software, hardware, firmware, or any combination thereof. It should also be appreciated that multiple controllers 900 may be used, whereby different features described herein may be executed on one or more different controllers, similar to the controller 900.

Accordingly, embodiments described herein allow for monitoring excitation of a generator based on a faulty status of a generator breaker by checking the reported status of the generator breaker and determining its actual status. Thus, a correct mode of excitation may be set and disorders in generator operation may be avoided.

References are made to block diagrams of systems, methods, apparatuses, and computer program products according to example embodiments. It will be understood that at least some of the blocks of the block diagrams, and combinations of blocks in the block diagrams, respectively, may be implemented at least partially by computer program instructions. These computer program instructions may be loaded onto a general purpose computer, special purpose computer, special purpose hardware-based computer, or other programmable data processing apparatus to produce a machine, such that the instructions, which execute on the computer or other programmable data processing apparatus, create means for implementing the functionality of at least some of the blocks of the block diagrams, or combinations of blocks in the block diagrams discussed.

These computer program instructions may also be stored in a computer-readable memory that can direct a computer or other programmable data processing apparatus to function in a particular manner, such that the instructions stored in the computer-readable memory produce an article of manufacture including instruction means that implement the function specified in the block or blocks. The computer program instructions may also be loaded onto a computer or other programmable data processing apparatus to cause a series of operational steps to be performed on the computer or other programmable apparatus to produce a computer implemented process, such that the instructions that execute on the computer or other programmable apparatus provide steps for implementing the functions specified in the block or blocks.

One or more components of the systems and one or more elements of the methods described herein may be implemented through an application program running on an operating system of a computer. They also may be practiced with other computer system configurations, including hand-held devices, multiprocessor systems, microprocessor based or programmable consumer electronics, mini-computers, mainframe computers, and the like.

Application programs that are components of the systems and methods described herein may include routines, programs, components, data structures, and so forth that implement certain abstract data types and perform certain tasks or actions. In a distributed computing environment, the application program (in whole or in part) may be located in local memory or in other storage. In addition, or alternatively, the application program (in whole or in part) may be located in remote memory or in storage to allow for circumstances where tasks are performed by remote processing devices linked through a communications network.

Many modifications and other embodiments of the example descriptions set forth herein to which these descriptions pertain will come to mind having the benefit of the teachings presented in the foregoing descriptions and the associated drawings. Thus, it will be appreciated that the disclosure may be embodied in many forms and should not be limited to the example embodiments described above. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed is:

1. A method comprising:
   receiving, from a contact associated with a generator breaker, a reported status of the generator breaker;
   receiving operational data associated with one or more parameters of a generator associated with the generator breaker;
   correlating the reported status of the generator and the operational data;
   establishing an actual status of the generator breaker based at least in part on the correlation; and
   based at least in part on the actual status, selectively modifying a mode of excitation of the generator.

2. The method of claim 1, wherein the mode of excitation is offline when the actual status of the generator breaker is open.

3. The method of claim 1, wherein the mode of excitation is online when the actual status of the generator breaker is closed.

4. The method of claim 1, wherein the one or more parameters include a load current of the generator.

5. The method of claim 4, wherein a substantially zero value of the load current indicates opening of the generator breaker.

6. The method of claim 1, wherein the one or more parameters include one or more voltage values associated with the generator.

7. The method of claim 6, wherein a transient in the one or more voltage values over a period of time indicates opening of the generator breaker.

8. The method of claim 7, wherein the period of time includes a time of a change in the reported status of the generator breaker.

9. The method of claim 1, wherein the reported status of the generator breaker is used to set the mode of excitation of the generator.

10. A system comprising:
    a controller; and
    a processor communicatively coupled to the controller and configured to:
      receive, from a contact associated with a generator breaker, a reported status of the generator breaker;
      receive operational data associated with one or more parameters of a generator associated with the generator breaker;
      correlate the reported status of the generator breaker and the operational data;
      establish an actual status of the generator breaker based at least in part on the correlation; and
      based at least in part on the actual status, selectively modify a mode of excitation of the generator.

11. The system of claim 10, wherein the mode of excitation is offline when the actual status of the generator breaker is open.

12. The system of claim 10, wherein the mode of excitation is online when the actual status of the generator breaker is closed.

13. The system of claim 10, wherein the one or more parameters include a load current of the generator.

14. The system of claim 13, wherein a substantially zero value of the load current indicates opening of the generator breaker.

15. The system of claim 10, wherein the one or more parameters include one or more voltage values associated with the generator.

16. The system of claim 15, wherein a transient in the one or more voltage values over a period of time indicates opening of the generator breaker.

17. The system of claim 16, wherein the period of time includes a time of a change in the reported status of the generator breaker.

18. A system comprising:
    a generator;
    an exciter coupled to the generator;
    a generator breaker coupled to the generator;
    a contact coupled to the generator breaker;
    a controller communicatively coupled to the generator and the exciter;
    a processor communicatively coupled to the controller and configured to:
      receive, from the contact associated with the generator breaker, a reported status of the generator breaker;
      receive operational data associated with one or more parameters of the generator associated with the generator breaker;
      correlate the reported status of the generator breaker and the operational data;
      based at least in part on the correlation, establish an actual status of the generator breaker; and
      based at least in part on the actual status, selectively modify a mode of excitation of the generator.

19. The system of claim 18, wherein the one or more parameters include a load current of the generator, wherein a substantially zero value of the load current indicates opening of the generator breaker.

20. The system of claim 18, wherein the one or more parameters include one or more voltage values associated with the generator, wherein a transient in the one or more voltage values over a period of time indicates opening of the generator breaker.

* * * * *

UNITED STATES PATENT AND TRADEMARK OFFICE
CERTIFICATE OF CORRECTION

| | | |
|---|---|---|
| PATENT NO. | : 8,964,337 B2 | Page 1 of 1 |
| APPLICATION NO. | : 13/729885 | |
| DATED | : February 24, 2015 | |
| INVENTOR(S) | : Sharma et al. | |

It is certified that error appears in the above-identified patent and that said Letters Patent is hereby corrected as shown below:

In The Specification

In Column 5, Line 60, delete "required and" and insert -- required, and --, therefor.

Signed and Sealed this
Twenty-sixth Day of January, 2016

Michelle K. Lee
*Director of the United States Patent and Trademark Office*